United States Patent
Dold

(10) Patent No.: US 11,056,825 B2
(45) Date of Patent: Jul. 6, 2021

(54) HIGH VOLTAGE BUS CONNECTION INSULATOR

(71) Applicant: Hamilton Sundstrand Corporation, Charlotte, NC (US)

(72) Inventor: Robert H. Dold, Monson, MA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 16/674,904

(22) Filed: Nov. 5, 2019

(65) Prior Publication Data
US 2021/0135397 A1 May 6, 2021

(51) Int. Cl.
| | |
|---|---|
| H05K 1/11 | (2006.01) |
| H01R 13/53 | (2006.01) |
| H01R 25/16 | (2006.01) |
| H02G 5/00 | (2006.01) |
| H01R 13/50 | (2006.01) |
| H02G 5/10 | (2006.01) |

(52) U.S. Cl.
CPC ............. *H01R 13/53* (2013.01); *H01R 13/50* (2013.01); *H01R 25/161* (2013.01); *H02G 5/005* (2013.01); *H02G 5/10* (2013.01)

(58) Field of Classification Search
CPC .......... H05K 1/14; H05K 1/141; H05K 1/142; H05K 1/145; H05K 1/147–148; H05K 2201/046; H05K 2201/047; H05K 2201/049

USPC ................................................. 361/784, 794
See application file for complete search history.

(56) References Cited

U.S. PATENT DOCUMENTS

| | | | |
|---|---|---|---|
| 3,932,932 A * | 1/1976 | Goodman | ............ H05K 1/0265 29/852 |
| 5,034,803 A | 7/1991 | Crowe et al. | |
| 7,819,681 B1 | 10/2010 | Rodrigues et al. | |
| 8,519,561 B2 | 8/2013 | Azuma et al. | |
| 2011/0081793 A1 | 4/2011 | Hughes et al. | |
| 2011/0132635 A1 | 6/2011 | Lesieur et al. | |

FOREIGN PATENT DOCUMENTS

| | | |
|---|---|---|
| KR | 20170118839 A | 10/2017 |
| WO | 2018013404 A1 | 1/2018 |

OTHER PUBLICATIONS

Extended European search report issued in corresponding EP application No. 20205671.9, dated Mar. 11, 2021.

* cited by examiner

*Primary Examiner* — Phuong K Dinh
(74) *Attorney, Agent, or Firm* — Locke Lord LLP; Scott D. Wofsy; Georgi Korobanov

(57) ABSTRACT

An insulator for a bus connector arrangement including a first layer defining at least one first aperture, a first annular protrusion emanating from the first layer at one first aperture, a second layer defining at least one second aperture configured to align with each of the at least one first apertures, and at least one second annular protrusion emanating from the second layer at each of the at least one second apertures.

16 Claims, 3 Drawing Sheets

HIGH VOLTAGE BUS CONNECTION INSULATOR

BACKGROUND

Technological Field

The present disclosure relates to a bus connector, and more particularly to an insulating bus connector for a high voltage controller.

Description of Related Art

Controllers typically required a bus connection having multiple electrical connectors. At today's high voltage requirements, and small clearances conductors can produce voltage jumps at high altitudes. Envelope requirements place further necessitates compact designs.

The conventional methods and systems have generally been considered satisfactory for their intended purpose. However, there is still a need in the art for a voltage insulator having a smaller footprint while providing better insulation against shorts and sparks during high altitude operation. There also remains a need in the art for such components that are economically viable. The present disclosure may provide a solution for at least one of these remaining challenges.

SUMMARY OF THE INVENTION

An insulator for a bus connector arrangement includes a first layer defining at least one first aperture, a first annular protrusion emanating from the first layer at one first aperture, a second layer defining at least one second aperture configured to align with each of the at least one first apertures, and at least one second annular protrusion emanating from the second layer at each of the at least one second apertures. The first annular protrusions are an integral part of the first layer and wherein the second annular protrusions are an integral part of the second layer. The first layer, the first annular protrusions, the second layer and the second annular protrusions define an uninterrupted tortuous path within a gap therebetween sized to ensure safe dielectric spacing at voltages and altitudes that the bus connector arrangement is configured to operate at.

The bus connector can include a first laminated bus structure including at least one aperture corresponding to the at least one aperture of the first insulator layer, a second laminated bus structure positioned opposite the first laminated bus structure including at least one aperture corresponding to the at least one aperture of the first laminated bus structure, and a bushing seated within each aperture of the first laminated bus structure and each aperture of the second bus structure. The first layer can be bonded to the first limited bus structure, and the second layer can be bonded to the second laminated bus structure. The first layer of the insulator can bonded to the first laminated bus structure with epoxy or double sided tape. The bushing can include a conductive material. A cold plate can be situated between the first laminated bus structure and the second laminated bus structure.

Each layer of the insulator can include a first planar surface on a first side and multiple surfaces on a second side. The at least one protrusion of the first layer of the insulator can surround the at least one protrusion of the second layer. The at least one protrusion of the second layer can be adjacent to an outer portion of at least one protrusion of the first layer. The at least one protrusion of the second layer can be adjacent to an outer wall of the first layer and at least one protrusion of the first layer. At least one layer includes at least a first aperture having a diameter greater than a diameter of a second aperture. At least one layer can includes at least a first protrusion having a length greater than a length of a second aperture.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION

Figure 1:
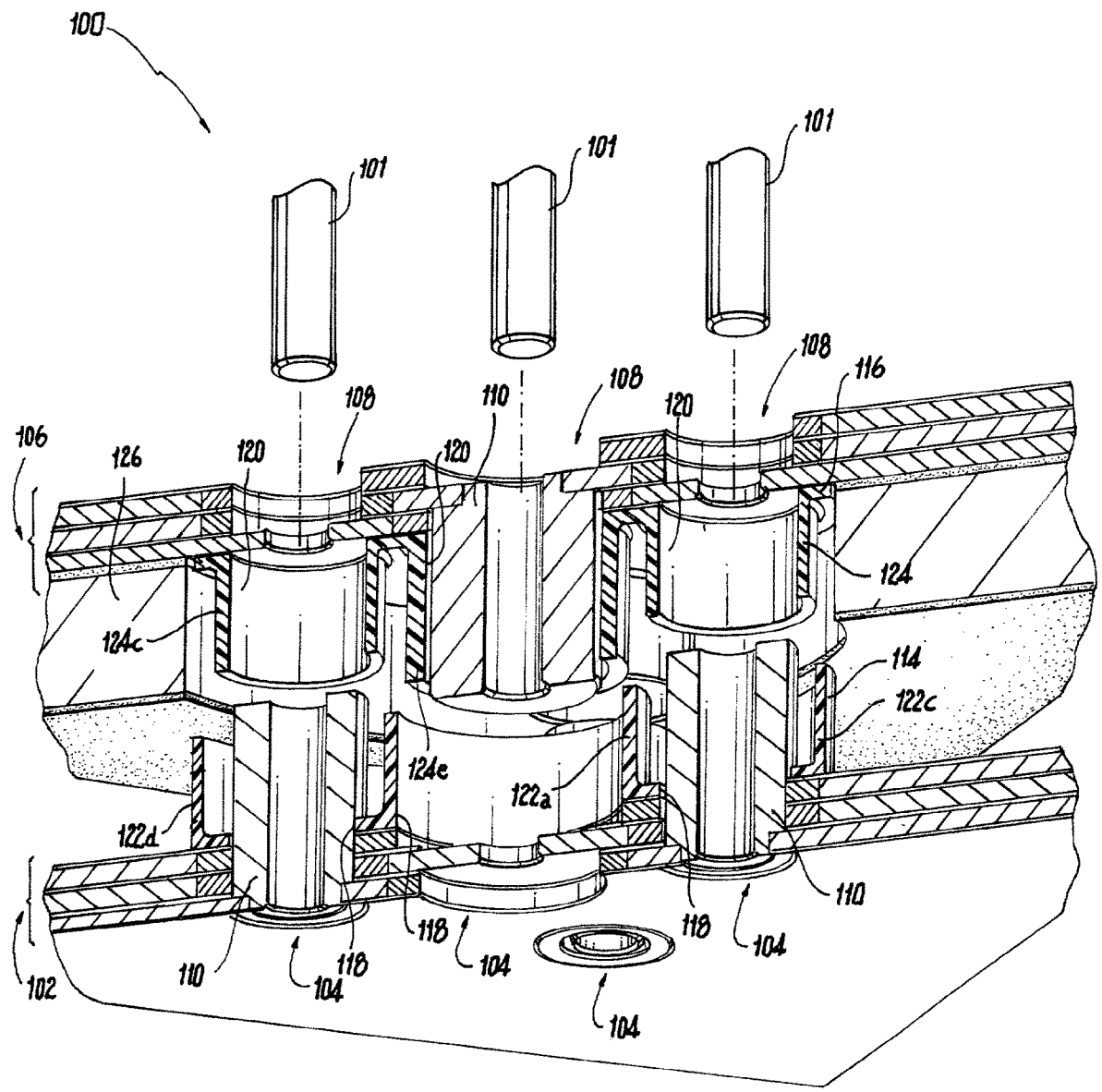
FIG. 1 is an exploded cut away view of a bus connector according to an embodiment of this disclosure.

Reference will now be made to the drawings wherein like reference numerals identify similar structural features or aspects of the subject invention. For purposes of explanation and illustration, and not limitation, a partial view of an exemplary embodiment of a voltage bus connector in accordance with the invention is shown in FIG. 1 and is designated generally by reference character 100. Other embodiments of the connector and insulator thereof in accordance with the disclosure are provided in FIGS. 2 and 3, as will be described. The methods and systems of the invention can be used to reduce sparks and voltage jumps within bus bar connections.

FIG. 1 shows a bus connector 100 for receiving electrical connectors 101 including a first laminated bus structure 102 including an array of apertures 104 positioned opposite of a second laminated bus structure 106 also including an array of apertures 108 corresponding to the array of apertures 104 of the first laminated bus structure 102. A conductive bushing 110 is seated within each aperture 104/108 of the laminated bus structures 102/106. An insulator having a first layer 114 and a second layer 116 seated between the laminated bus structures 102/106. The first layer 114 and the second layer 116 include a plastic material. Each layer 114/116 includes an array of apertures 118/120 therein configured for receiving an electrical element and and array of annular protrusions 122/124 emanating from each layer 114/116 defining each apertures 118/120. The first layer 114 is bonded to the first laminated bus structure 102, and the second layer 116 is bonded to the second laminated bus structure 106. The bus structures 102/106 can be bonded to the corresponding insulator layers 114/116 with epoxy or double sided tape. A cold plate 126 is situated between the first laminated bus structure 102 and the second laminated bus structure 106.

Figure 2:
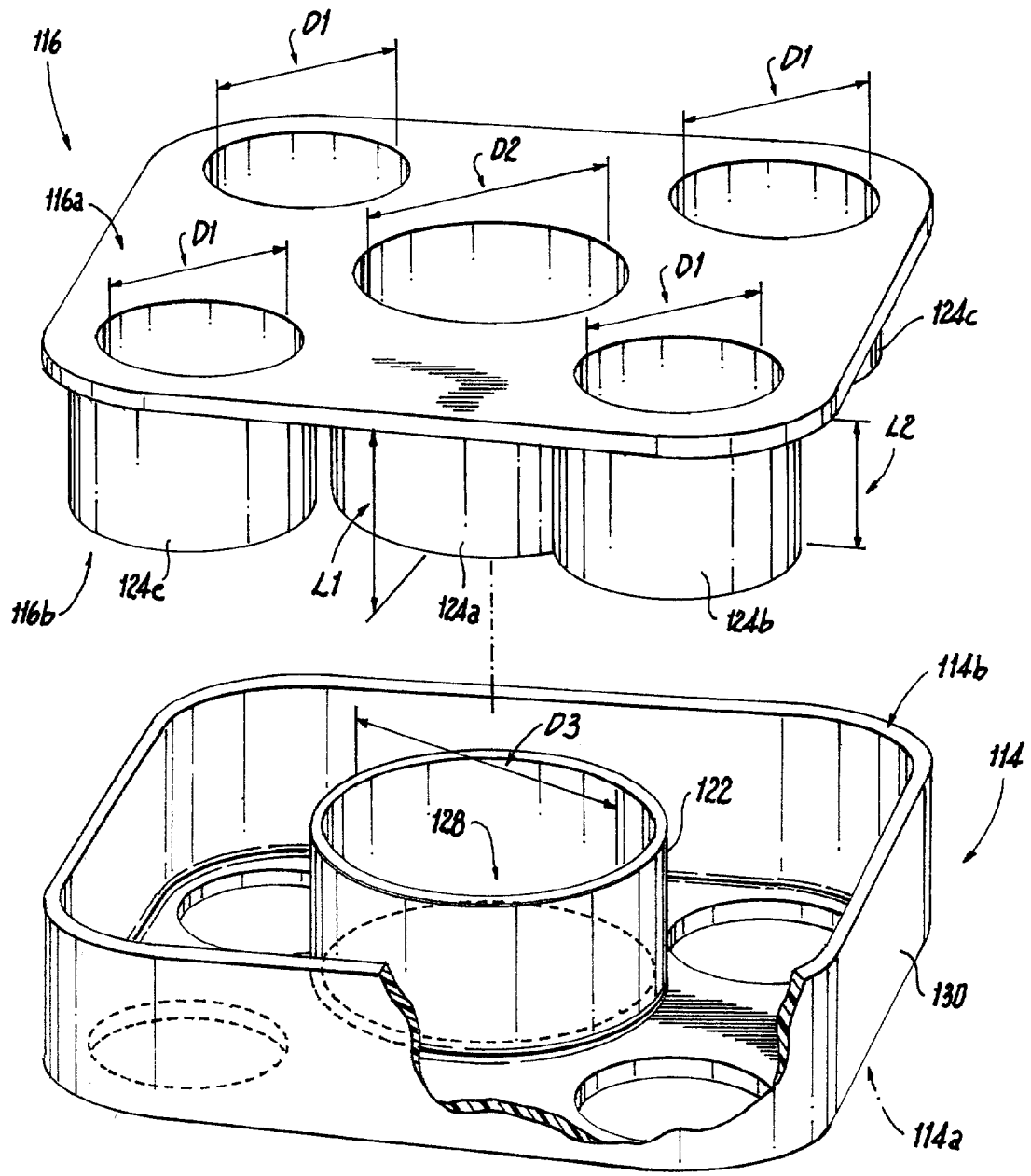
FIG. 2 is an exploded away view of FIG. 1, showing only the insulators of the bus connector.

FIG. 2 shows each layer 114/116 of the insulator 112. Each layer 114/116 of the insulator includes a first planar surface on a first side 114a/116a and multiple elevations and surfaces on a second side 114b/116b. The multiple elevations are due to the annular protrusions 122/124a-e emanating from each layer 114/116 defining each apertures 118/120. Central protrusion 124a of the second layer 116 includes a greater length than the rest of the protrusions 124b-e. Central protrusion 124a also includes a greater diameter than protrusions 124b-e. The first layer includes only a single protrusion 122. Protrusion 122 of the first layer 114 surrounds the central protrusion 124a of the second layer 116. The protrusions 124b-e of the second layer surround the protrusion 122 of the first layer 114 and are adjacent to an outer portion 128 of central protrusion 122a of the first layer 114. Further, the protrusions 124b-e of the second layer are adjacent to an outer wall 130 of the first layer 114 and to the protrusion 122 of the first layer 114.

Figure 3:
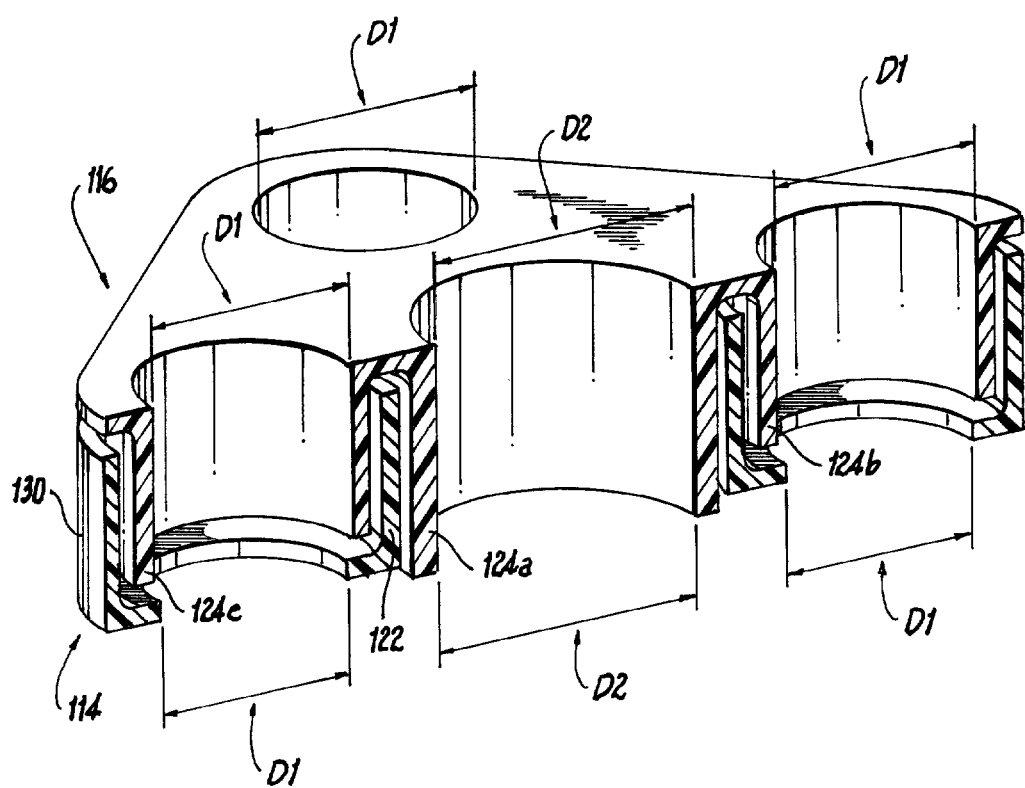
FIG. 3. is an cut away view of FIG. 2, showing the interconnection of the insulator layers.

FIG. 3 shows a detailed view of the interconnected layers 114/116. The central protrusion 124a extends through the protrusion 122 of the first layer 114, and is flush with the first side 114a of the first layer 114. Lengths and diameter of the protrusions 122/124a-e are sized the required creep distances necessary to ensure safe dielectric spacing at the required voltages and altitudes. The interlocking aspects of the design allow longer creepage distances without having to increase the size of the connection.

The methods and systems of the present disclosure, as described above and shown in the drawings, provide for an electrical connector and insulator thereof with superior properties including increased reliability and stability, and reduced size, weight, complexity, and/or cost. While the apparatus and methods of the subject disclosure have been showing and described with reference to embodiments, those skilled in the art will readily appreciate that changes and/or modifications may be made thereto without departing from the spirit and score of the subject disclosure.

What is claimed is:

1. An insulator for a bus connector arrangement comprising:
   a first layer defining at least one aperture;
   a first protrusion emanating from at least one of the at the at least one aperture of the first layer;
   a second layer defining at least one aperture configured to align with each of the at least one apertures of the first layer;
   at least one second protrusion emanating from the second layer at each of the at least one apertures of the second layer; and
   wherein the first layer, the annular protrusion thereof, the second layer, and the annular protrusions thereof define a tortuous path therebetween sized to ensure safe dielectric spacing at voltages and altitudes that the bus connector arrangement is configured to operate at.

2. The insulator of claim 1, wherein the protrusion of the first layer are an integral part of the first layer and wherein the protrusions of the second layer are an integral part of the second layer.

3. An insulator for a bus connector arrangement comprising:
   a first layer defining at least one aperture;
   a first protrusion emanating from at least one of the at the at least one aperture of the first layer;
   a second layer defining at least one aperture configured to align with each of the at least one apertures of the first layer;
   at least one second protrusion emanating from the second layer at each of the at least one apertures of the second layer;
   a first laminated bus structure including at least one aperture corresponding to the at least one aperture of the first insulator layer;
   a second laminated bus structure positioned opposite the first laminated bus structure including at least one aperture corresponding to the at least one aperture of the first laminated bus structure; and
   a bushing seated within each aperture of the first laminated bus structure and each aperture of the second bus structure.

4. The insulator of claim 3, wherein the first layer is bonded to the first limited bus structure, and the second layer is bonded to the second laminated bus structure.

5. The insulator of claim 3, wherein the insulator prevents a straight line-of-sight between bushings in adjacent apertures.

6. The bus connector of claim 3, wherein first layer of the insulator is bonded to the first laminated bus structure with epoxy or double sided tape.

7. The bus connector of claim 3, wherein the bushing includes a conductive material.

8. The bus connector of claim 3, further comprising a cold plate situated between the first laminated bus structure and the second laminated bus structure.

9. An insulator for a bus connector arrangement comprising:
   a first layer defining at least one aperture;
   a first protrusion emanating from at least one of the at the at least one aperture of the first layer;
   a second layer defining at least one aperture configured to align with each of the at least one apertures of the first layer;
   at least one second protrusion emanating from the second layer at each of the at least one apertures of the second layer; and
   an uninterrupted gap between the first layer and the second layer.

10. The bus connector of claim 1, wherein the insulator includes a plastic material.

11. The bus connector of claim 1, wherein the each layer of the insulator includes a first planar surface on a first side and multiple surfaces on a second side.

12. An insulator for a bus connector arrangement comprising:
   a first layer defining at least one aperture;
   a first protrusion emanating from at least one of the at the at least one aperture of the first layer;
   a second layer defining at least one aperture configured to align with each of the at least one apertures of the first layer; and
   at least one second protrusion emanating from the second layer at each of the at least one apertures of the second layer, wherein the at least one protrusion of the first layer of the insulator surrounds at the least one protrusion of the second layer.

13. The bus connector of claim 12, wherein at least one protrusion of the second layer is adjacent to an outer portion of at least one protrusion of the first layer.

14. An insulator for a bus connector arrangement comprising:
   a first layer defining at least one aperture;
   a first protrusion emanating from at least one of the at the at least one aperture of the first layer;
   a second layer defining at least one aperture configured to align with each of the at least one apertures of the first layer;

at least one second protrusion emanating from the second layer at each of the at least one apertures of the second layer, wherein the at least one protrusion of the second layer is adjacent to an outer wall of the first layer and at least one protrusion of the first layer.

15. The bus connector of claim 1, wherein at least one layer includes at least a first aperture having a diameter greater than a diameter of a second aperture.

16. The bus connector of claim 1, wherein at least one layer includes at least a first protrusion having a length greater than a length of a second aperture.

\* \* \* \* \*